(12) United States Patent
Auvenshine et al.

(10) Patent No.: US 10,691,367 B2
(45) Date of Patent: Jun. 23, 2020

(54) DYNAMIC POLICY PRIORITIZATION AND TRANSLATION OF BUSINESS RULES INTO ACTIONS AGAINST STORAGE VOLUMES

(71) Applicant: INTERNATIONAL BUSINESS MACHINES CORPORATION, Armonk, NY (US)

(72) Inventors: John J. Auvenshine, Tuscon, AZ (US); David Schustek, Douglas, CO (US); Tron H. Pryor, Kissimmee, FL (US); Luis Ignacio Callero, Gral Pacheco (AR); Laura Richardson, Tampa, FL (US); Robert Ong Sio, Mississauga (CA); David Lutz, Newmarket (CA); Dave Aime Desire Kodjo, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/175,622

(22) Filed: Oct. 30, 2018

(65) Prior Publication Data

US 2020/0133559 A1 Apr. 30, 2020

(51) Int. Cl.
*G06F 12/00* (2006.01)
*G06F 3/06* (2006.01)

(52) U.S. Cl.
CPC .......... *G06F 3/0649* (2013.01); *G06F 3/0605* (2013.01); *G06F 3/0629* (2013.01); *G06F 3/0665* (2013.01); *G06F 3/0683* (2013.01)

(58) Field of Classification Search
CPC .... G06F 3/0649; G06F 3/0665; G06F 3/0629; G06F 3/0683; G06F 3/0605

(Continued)

(56) References Cited

U.S. PATENT DOCUMENTS

| 8,386,418 B2 | 2/2013 | Birch et al. |
| 8,423,731 B1 * | 4/2013 | Nadathur ............ G06F 11/1461 707/640 |

(Continued)

FOREIGN PATENT DOCUMENTS

| JP | 2006085208 A | 3/2006 |
| JP | 2008027233 A | 2/2008 |

OTHER PUBLICATIONS

Yang, et al., "A Novel Information Lifecycle Management Scheme for a Web-Based Database System," Journal of Scientific & Industrial Research, vol. 76, pp. 85-89. Feb. 2017.

(Continued)

*Primary Examiner* — Mardochee Chery
(74) *Attorney, Agent, or Firm* — Maeve M. Carpenter, Esq.; Wayne F. Reinke, Esq.; Heslin Rothenberg Farley & Mesiti P.C.

(57) ABSTRACT

A computer-implemented method of information lifecycle management is disclosed. The computer-implemented method includes reading, by a data processing system of a storage environment, business rules and policies for managing data in storage volumes of the storage environment, the policies being based on the predetermined business rules, and analyzing, by the data processing system, available storage and capacity in the storage environment. The computer-implemented method further includes dynamically prioritizing, by the data processing system, the policies based, at least in part, on results of the analyzing, resulting in prioritized policies, cognitively translating, by the data processing system, one or more of the predetermined business rules into action(s) against one or more of the storage volumes based, at least in part, on the prioritized policies, and executing, by the data processing system, the action(s).

20 Claims, 10 Drawing Sheets

(58) Field of Classification Search
USPC .......................................... 711/161, 162, 117
See application file for complete search history.

(56) References Cited

U.S. PATENT DOCUMENTS

| | | | |
|---|---|---|---|
| 9,189,168 B2 | 11/2015 | Nemoto et al. | |
| 10,225,162 B1* | 3/2019 | Jain | G06F 3/0605 |
| 10,372,547 B1* | 8/2019 | Zhu | G06F 3/0649 |
| 2011/0131174 A1 | 6/2011 | Birch et al. | |
| 2013/0191354 A1 | 7/2013 | Wilf | |
| 2015/0293984 A1 | 10/2015 | Zolotusky, Jr. et al. | |
| 2017/0235512 A1* | 8/2017 | Ruchita | G06F 3/0604 |
| | | | 711/170 |
| 2017/0262185 A1* | 9/2017 | Long | G06F 3/0605 |
| 2019/0036778 A1* | 1/2019 | Bathen | H04L 41/0893 |

OTHER PUBLICATIONS

Alba, et al., "Efficient and agile storage management in software defined environments," IBM J. RES. & DEV., vol. 58, No. 2/3 Paper 5 Mar./May 2014. Mar. 2014.

\* cited by examiner

DYNAMIC POLICY PRIORITIZATION AND TRANSLATION OF BUSINESS RULES INTO ACTIONS AGAINST STORAGE VOLUMES

BACKGROUND

One or more aspects of this disclosure relate, in general, to Information Lifecycle Management (ILM). More particularly, one or more aspects of this disclosure relate to dynamic ILM policy prioritization and translation of business rules into actions against storage volumes based, at least in part, on the prioritized policies.

Policies are central to the implementation of any form of Information Lifecycle Management (ILM). Data is moved around over its life to both maintain the performance and capacity of primary systems while reducing the overall cost of storing the complete set of data. These policies are usually implemented manually or by means of crude rules and scripts which may fail to optimize.

SUMMARY

Shortcomings of the prior art are overcome and additional advantages are provided through the provision, in one aspect, of a computer-implemented method of information lifecycle management. The method includes reading, by a data processing system of a storage environment, a plurality of predetermined business rules and a plurality of policies for managing data in a plurality of storage volumes of the storage environment, the plurality of policies being based on the plurality of predetermined business rules, and analyzing, by the data processing system, available storage and capacity in the storage environment. The method further includes: dynamically prioritizing, by the data processing system, the plurality of policies based, at least in part, on results of the analyzing, resulting in prioritized policies; cognitively translating, by the data processing system, one or more of the plurality of predetermined business rules into one or more actions against one or more of the plurality of storage volumes based, at least in part, on the prioritized policies; and executing, by the data processing system, the one or more actions.

In another aspect, a system of information lifecycle management may be provided. The system may include, for example, memory(ies), at least one processor in communication with the memory(ies). Further, the system may include program instructions executable by the one or more processor via the memory to perform a method. The method may include, for example, reading, by a data processing system of a storage environment, a plurality of predetermined business rules and a plurality of policies for managing data in a plurality of storage volumes of the storage environment, the plurality of policies being based on the plurality of predetermined business rules, and analyzing, by the data processing system, available storage and capacity in the storage environment. The computer-implemented method includes dynamically prioritizing, by the data processing system, the plurality of policies based, at least in part, on results of the analyzing, resulting in prioritized policies, cognitively translating, by the data processing system, one or more of the predetermined business rules into one or more actions against one or more of the plurality of storage volumes based, at least in part, on the prioritized policies, and executing, by the data processing system, the one or more actions.

In a further aspect, a computer program product may be provided. The computer program product may include a storage medium readable by a processor and storing instructions for performing a method. The method may include, for example, reading, by a data processing system of a storage environment, a plurality of predetermined business rules and a plurality of policies for managing data in storage volumes of the storage environment, the plurality of policies being based on the plurality of predetermined business rules, and analyzing, by the data processing system, available storage and capacity in the storage environment. The computer-implemented method includes dynamically prioritizing, by the data processing system, the plurality of policies based, at least in part, on results of the analyzing, resulting in prioritized policies, cognitively translating, by the data processing system, one or more of the predetermined business rules into action(s) against one or more of the plurality of storage volumes based, at least in part, on the prioritized policies, and executing, by the data processing system, the action(s).

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
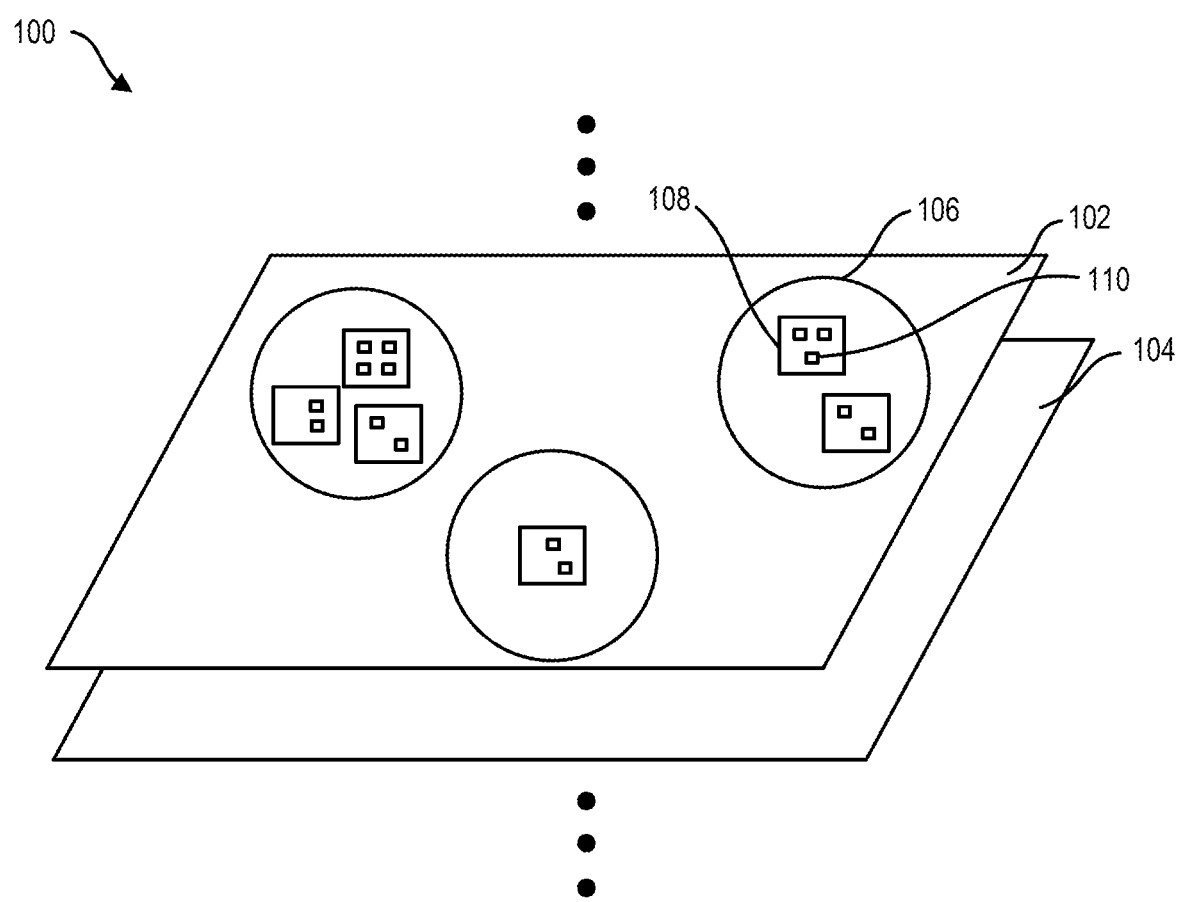
FIG. 1 is a block diagram visualizing one example of a portion of a storage environment, in accordance with one or more aspects of the present disclosure.

Disclosed herein, in accordance with one or more aspects of the present invention, is a computer-implemented method and related system and program product for Intelligent ILM. Policies are dynamically prioritized.

As used herein, "IILM Engine" refers to a system for managing information lifecycles that dynamically prioritizes storage policies between IILM cycles and translates a given business rule into executed action(s) against storage volume(s).

As used herein, the term "action" refers to making one or more adjustments to one or more storage volumes. The storage volume adjustments include, for example, migrating (tiering up or tiering down), transforming (compressing or thinning), treatment of a volume different from an applicable policy(ies), changing capacity of a volume, changing tier density, changing response time, moving within tier and balancing storage volumes across a tier.

As used herein, the term "tiering up" or "up-tiering" refers to migrating a storage volume to a tier with faster storage, i.e., with faster read/write speeds. Likewise, "tiering down" or "down-tiering" refers to migrating a volume to a tier with slower storage, i.e., storage with slower read/write speeds. In one example, storage tiers or layers may be ordered according to levels of activity and a predetermined threshold level of accesses (e.g., accesses per second per GB) may be used to make decisions regarding tiering up or tiering down.

As used herein, the term "thick" in relation to storage environments refers to reserving, within the storage device, all the space allocated to a volume. Likewise, the term "thin" refers to reserving only the space that has actually had data written to it. For example, a volume allocated 4 TB of space with 2.87 TB of data written would reserve 4 TB within the storage device if "thick," but only 2.87 TB if "thin." The term "thin in flight" means that when a volume is migrated, it is also thinned at the new destination. However, "thin" refers to how the volume is stored, not how it is transferred.

As used herein, the term "tier density" refers to the input/output (I/O) density of data stored on a given tier. For example, the I/O density may be given in accesses per unit time per unit storage (e.g., accesses per second per gigabyte).

As used herein, the term "dynamically" refers to a situation characterized by continual change, activity or progress.

As used herein, the term "real-time" refers to a period of time necessary for data processing and presentation to a user to take place, and which is fast enough that a user does not perceive any significant delay. Thus, "real-time" is from the perspective of the user.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

FIG. 1 is a block diagram visualizing one example of a portion 100 of a storage environment, in accordance with one or more aspects of the present disclosure. Various tiers, for example, tiers 102 and 104, representing levels of storage according to a speed of the memory in a given tier. In one example, tier 102 includes faster memory (i.e., more expensive) relative to tier 104, which includes slower memory (i.e., less expensive) relative to tier 102. Each tier includes one or more storage pools, for example, storage pool 106 in tier 102. The storage pools can be virtual or non-virtual, and can include any number of volumes, for example, volume 108 in storage pool 106. In one example, one volume at a time is processed. Each volume includes any number of physical storage devices, for example, physical storage device 110 in volume 108.

Figure 2:
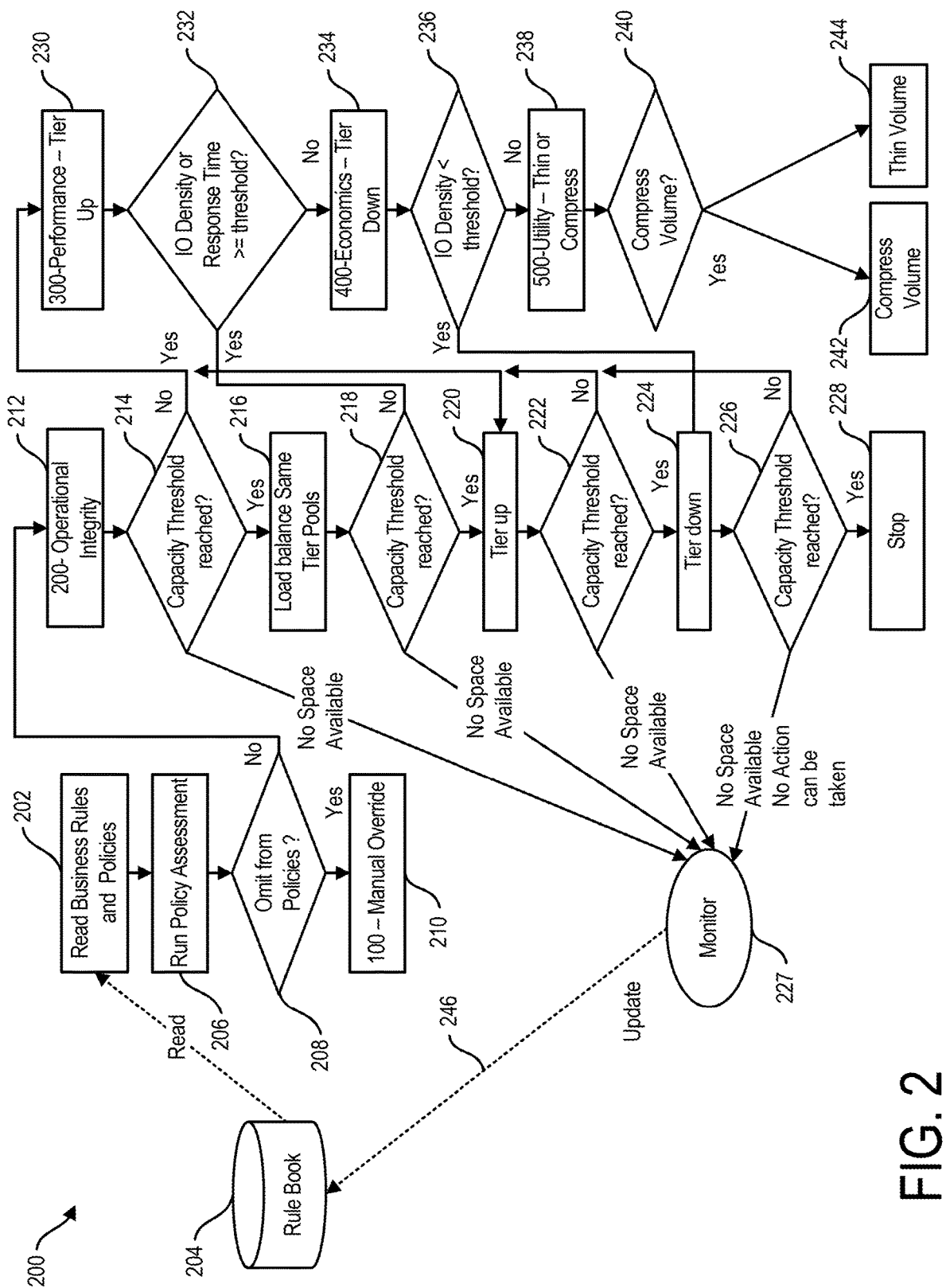
FIG. 2 is a flow diagram for one example of dynamic storage policy prioritization with translation of business rules into actions against storage volumes of a storage environment, in accordance with one or more aspects of the present disclosure.

FIG. 2 is a modified flow diagram 200 for one example of a computer-implemented method of Intelligent Information Lifecycle Management (IILM) executed by a data processing system of a storage environment, in accordance with one or more aspects of the present disclosure. The method begins by the data processing system reading 202 policies and predetermined business rules from a database 204 (the "rule book" as referred to herein). The policies will be addressed, for example, one at a time by the data processing system. Next, the system performs 206 a policy assessment of one of the policies. An inquiry 208 is then made by the data processing system as to whether to omit the policy from the policies. The data processing system is placed 210 into manual override, ceding control to an operator, where the data processing system determines the policy should be omitted (a "yes" answer to the inquiry). Thus, manual override is the first policy. The data processing system then performs 212 an operational integrity check, the second policy, which includes the steps in the middle column of FIG. 2, prior to the third policy. Next, an inquiry 214 is made by the data processing system as to whether a predetermined (but changeable) capacity threshold has been reached for the current volume. Load balancing 216 is performed for same-tier pools where the capacity threshold is reached (a "yes" answer to inquiry 214). The third policy, up-tiering 230 for performance, is performed where inquiry 214 results in a "no" answer. Up-tiering for performance includes migrating a volume to a higher (faster memory) tier.

Reverting back to the middle column of FIG. 2, after load balancing same-tier pools, an inquiry 218 is made as to whether the capacity threshold has been reached. If the capacity threshold has not been reached (a "no" answer to inquiry 218), the data processing system proceeds with the third policy. Tiering up 220 to improve performance of a volume is performed where the capacity threshold has been reached (a "yes" answer to inquiry 218). After tiering up, another inquiry 222 as to capacity threshold is made. As with related inquiries 214 and 218, a "no" answer moves the data processing system to the third policy. Tiering down 224 the current volume is performed where the capacity threshold is reached (a "yes" answer to inquiry 222), after which another capacity threshold inquiry 226 is made. As with the other capacity threshold inquiries, a "no" answer leads to the third policy. The method stops 228 as a result of the capacity threshold having been reached (a "yes" answer to inquiry 226). With any of the capacity threshold inquiries (214, 218, 222 and 226), if no space is available such that no action can be taken, the data processing system monitors 227 available space and updates 246 rule book 204. If the volume is tiered-up due to a lack of space, this has the effect of moving a volume requiring lower performance characteristics into a pool with high performance characteristics, in effect wasting some of that valuable space. In one example, the business may be alerted so that actions can be taken to make more space available, for example, deleting old volumes, acquiring more physical space, or adjusting volume performance goals. This alerting is also reflected by updating the rule book. The volume may need to be up-tiered for performance, but over-committing space risks an outage. If there isn't enough space in the target tier, one or more volumes may need to be moved farther up the ladder, or, at another or further action, the volumes that will be impacted the least may be down-tiered to leave room for those that have the highest performance demands.

Returning to the right-most column, after up-tiering 230, an inquiry 232 is made as to whether I/O density or response time has reached or exceeded the respective thresholds; if so, the method reverts to capacity threshold inquiry 218. Performing 234 the fourth policy, down-tier for economic reasons, is a result of neither I/O density nor response time reaching or exceeding threshold (a "no" answer to inquiry 232). An inquiry 236 is then made as to whether the I/O density is below threshold; if so, the method reverts to down-tiering 224. The fifth policy, thinning or compressing, is performed if the I/O density is not less than threshold (a "no" answer to inquiry 236). In one example, there may be a bias for thinning versus compression. In another example, compressing may only be performed if a desired compression ratio can be met, for example, at least a 50 percent reduction in size. As part of the fifth policy, an inquiry 240 can be made as to whether to compress the current volume. If the answer to inquiry 240 is a "yes," then the data processing system proceeds to compress the current volume. If compression is not warranted (a "no" answer to inquiry 240), then the volume may be thinned 244.

Disclosed herein includes, for example, a framework for specifying, storing, reading, and executing policies for Information Lifecycle Management (ILM), allowing the translation of business rules into actions against storage volumes which achieve desired cost and performance capabilities.

A mix of different policies describing the conditions and the desired data movement can be provided to an IILM processing engine for analysis and execution. An efficient and ordered prioritization of these policies is also provided. A series of prioritization principles from the rule book are applied to the policies by the IILM processing engine in order to ensure an orderly execution of the policies.

An Intelligent ILM (IILM) engine allows for previewing and automated up-tiering, down-tiering and pinning, the pinning based on pinning policies stored, for example, in the rule book. As used herein, the term "pinning policy(ies)" refers to fixing a volume as-is, including fixing the volume in a particular tier and fixing the volume's current state with regard to thick/thin and compressed/uncompressed. Pinning is a manual override of the existing polices, for example, for a subset of volumes with special requirements (e.g., LUNs of an important database may be pinned to the highest performing tier).

As one of ordinary skill in the art will know, a logical unit number (LUN) is a unique identifier for designating an individual or collection of physical or virtual storage devices that execute input/output (I/O) commands with a host computer, as defined by the Small System Computer Interface (SCSI) standard. SCSI is a widely implemented I/O interconnect that commonly facilitates data exchange between servers and storage devices through transport protocols such as Internet SCSI (iSCSI) and Fibre Channel (FC). A SCSI initiator in the host originates the I/O command sequence that is transmitted to a SCSI target endpoint or recipient storage device. A logical unit is an entity within the SCSI target that responds to the SCSI I/O command. The logical unit may be a part of a storage drive, an entire storage drive, or all of or parts of several storage drives such as hard disks, solid-state drives or tapes, in one or more storage systems. A LUN can reference an entire RAID set, a single drive or partition, or multiple storage drives or partitions. In any case, the logical unit is treated as if it is a single device and is identified by the logical unit number. A LUN is central to the management of a block storage array in a storage-area network (SAN). Using a LUN can simplify the management of storage resources because access and control privileges can be assigned through the logical identifiers. It also offers transformation policies to thin or to compress volumes using, for example, an online service. For these latter policies, there are additional guard rails that the Intelligent Storage Tiering Manager (ISTM) tool provides that make both compression and thin operationally safe to do.

Intelligent Storage Tiering Manager or ISTM reads in all policies at once; however, it executes policies one at a time. ISTM is a subset of IILM that handles migration between tiers. IILM Engine also handles thick/thin and compression, which is not handled by ISTM. The ISTM reads and executes policies within a given data migration window according to the business rules and corresponding storage policies. In one example, no more than 20 concurrent volume migrations (per SVC) are allowed, such that within a migration window, automation may not execute every policy. For this reason, policies may be executed in a certain order, such that the maximum is not exceeded, window not exceeded, etc. The present disclosure allows for any set of policies for ILM to be encoded and executed in the correct order to achieve the business goals for the environment.

Figure 3:
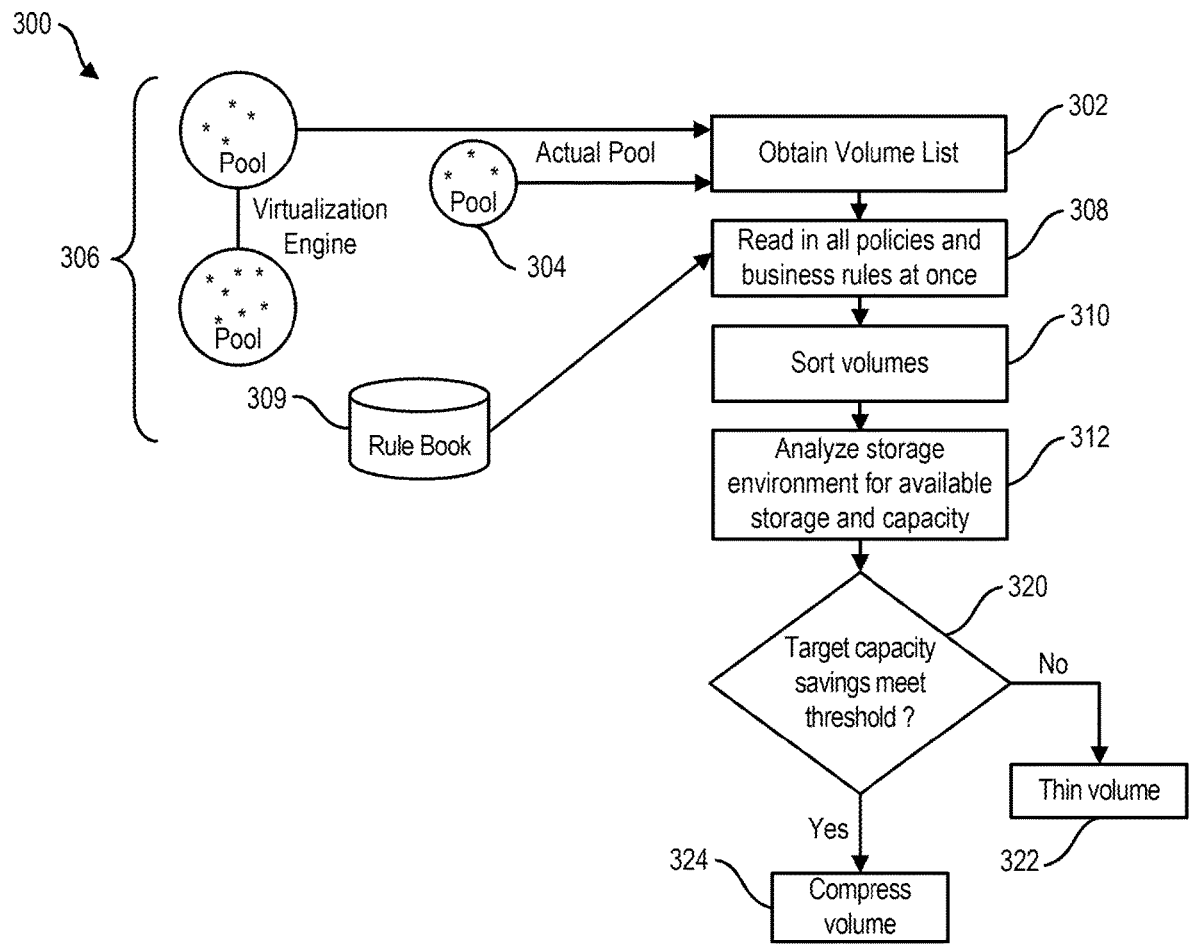
FIG. 3 is a flow diagram for one example of analyzing a storage environment for available storage and capacity based on analyzed storage policies, to develop actions against storage volumes in the storage environment, in accordance with one or more aspects of the present disclosure.

FIG. 3 is a flow diagram 300 for one example of analyzing policies, in accordance with one or more aspects of the present disclosure. Initially, the system obtains 302 a list of volumes, the volumes being addressed one at a time. For example, any of a single (e.g., pool 304) or multiple pools (e.g., 306) can be included. In addition, any or all of the pools can be virtual. After the volume list is obtained, the system reads in 308 all policies and business rules at once. The volumes are then sorted 310, for example, according to size. The storage environment is then analyzed for available storage and capacity, including for example, Input/Output (I/O) group level, I/O group threshold, pool capacity for target (using, e.g., round robin), target other pool and global capacity planning. The analysis is done by querying the storage device(s) for its actual state, and comparing that state to the desired or threshold state. For example, a pool with a capacity utilization threshold of 85 percent. When pool A is queries, it may be at 70 percent, which, in one example, means it has available capacity. When pool B is queried, it may be at 90 percent, which means, in another example, it does not have available capacity. An inquiry 320 is made as to whether the target capacity savings meet the threshold, for example, a 50 percent reduction. If the target capacity savings do not meet the threshold, the volume may be thinned 322. If the target capacity savings do meet the threshold, the volume may be compressed 324.

Figure 4:
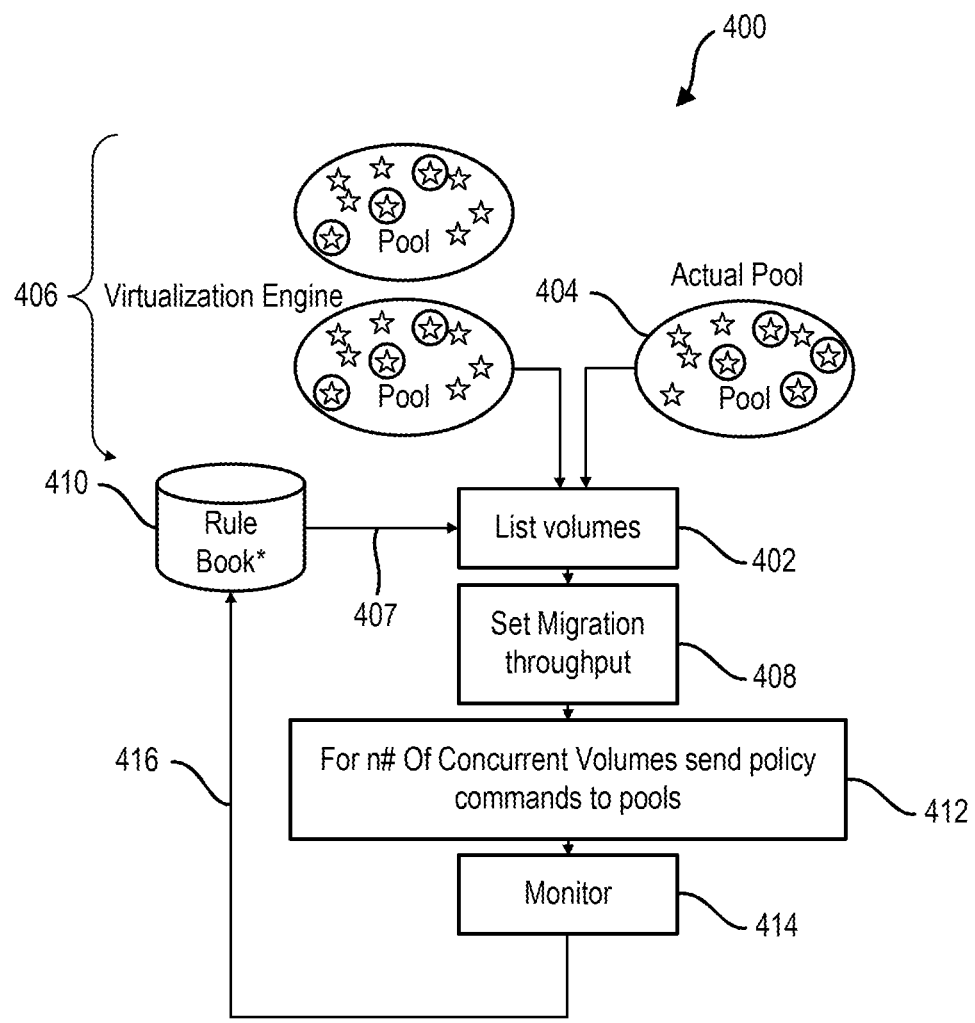
FIG. 4 is a flow diagram for one example of executing policy actions against volumes, in accordance with one or more aspects of the present disclosure.

FIG. 4 is a flow diagram 400 for one example of executing policy actions against volumes, in accordance with one or more aspects of the present disclosure. Initially, the system obtains 402 a list of volumes, the volumes being addressed one at a time. For example, any of a single (e.g., pool 404) or multiple pools (e.g., 406) can be included. In addition, any or all of the pools can be virtual. After the volume list is obtained, the system reads in 407 all policies and business rules at once from the rule book 410. The system then sets 408 the migration throughput. Policy commands are sent 412 to the pools (virtualization engine 406 and pool 404), subject to a maximum number of concurrent volumes. Monitoring 414 of the system takes place and the rule book is updated 416. Note that migration/transformation is limited by, for example, target pool capacity and actual versus configured performance samples.

A storage virtualization engine may be situated, for example, between a physical host and associated physical storage devices, the virtualization engine operating to allow the physical host to communicate with multiple storage devices as if they were one storage device.

In one example, a prioritized set of policies in a tiered storage environment (e.g., a three-tier storage environment) includes, for example: first, tiering up to address a performance need; second, tiering down to free up expensive (i.e., faster) tier storage space; third, transforming a volume to thin; and fourth, transforming a volume to compressed.

Policy action execution includes: read in first action to perform (migration or transformation); number of concurrent volumes per virtualization engine; set migration throughout; send policy commands to each virtualization engine. Migration/transformation list is limited by target pool capacity, and actual versus configured performance samples.

In one embodiment, the data processing system can, for example, automatically switch to another business rule and corresponding policy set. In one example, the automatic business rule switching can be accomplished using an adaptation algorithm. For example, if the response time exceeds a certain threshold, then the data processing system can shift policy sets from, for example, "maximum savings" to, for example, "operational integrity" without human intervention.

Figure 5:
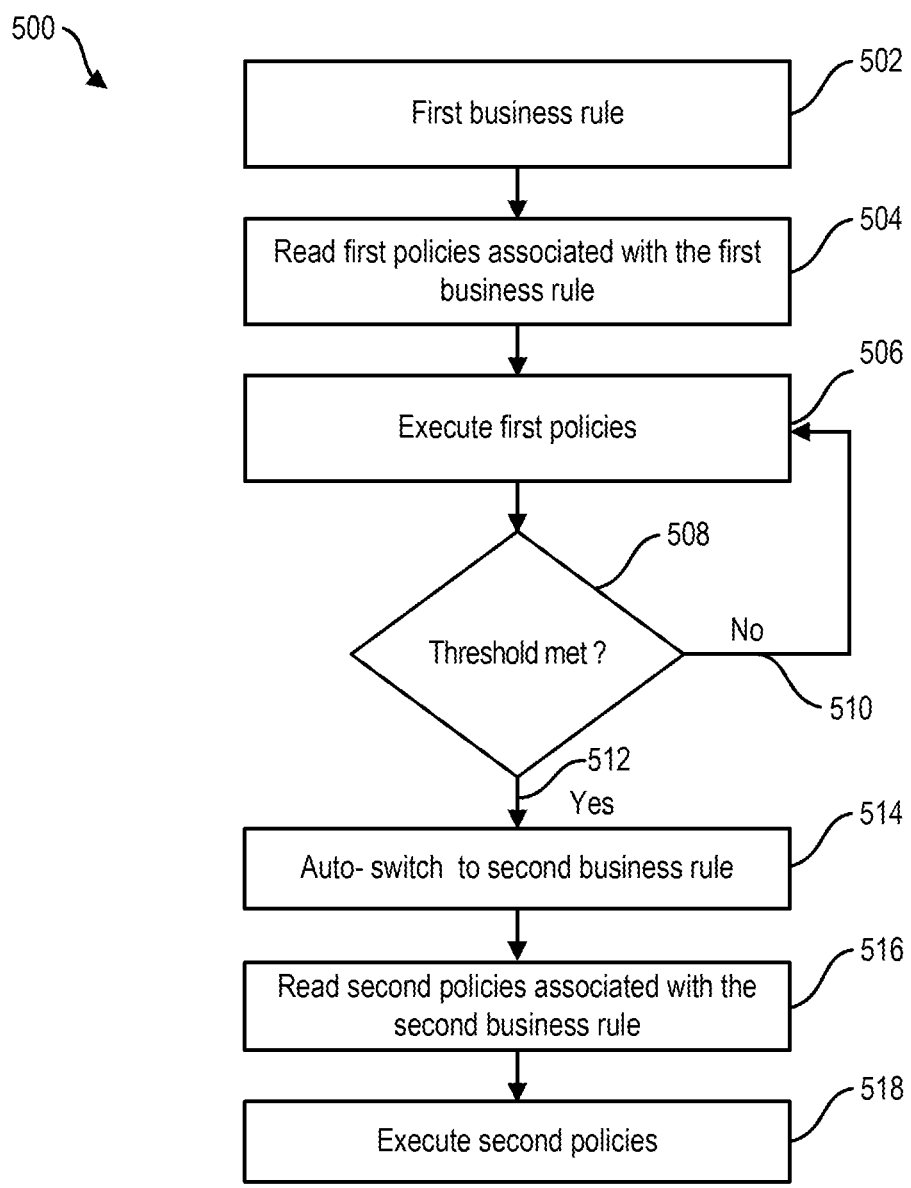
FIG. 5 is a flow diagram for one example of automatically switching business rules based on a current status of a storage environment and the storage volumes therein, in accordance with one or more aspects of the present disclosure.

FIG. 5 is a flow diagram 500 for one example of automatically switching business rules based on a current status of a storage environment and the storage volumes therein, in accordance with one or more aspects of the present disclosure. Initially, the system uses 502 a first business rule. First policies associated with the first business rule are read in 504 and thereafter executed 506. An inquiry 508 is then made as to whether a threshold is met. If the threshold has not been met (a "no" 510 answer to inquiry 508), then the system returns to executing the first policies. If the threshold has been met (a "yes" 512 answer to inquiry 508), the system proceeds to automatically switch 514 to a second business rule. Second policies associated with the second business rule are also read in 516 and thereafter executed 518.

Also, in a cognitive manner, the IILM engine can learn and adapt. For example, if the response time exceeds a certain threshold, then it can shift policy sets from "maximize savings" to "operational integrity" without human intervention. For example, for maximize savings, at the time of migration, the engine may select, for example, largest volumes first, then apply compression and thinning policies. Another example may be, that as storage becomes more or less densely populated, or ages, the engine can automatically classify and reclassify the pools of storage to align with the business needs the pool is able service at that time, then realign data accordingly.

Another example of a business rule driving policy order is "operational integrity", where, for example, if a volume should be up-tiered, migrate it first and thin it in flight. Then, if a volume should be down-tiered, move it to a lower tier and thin it in flight. In one example, this can be repeated for all volumes. Third, evaluate volumes for compression and compress volumes that meet the configured compression ratio. When all volumes have been migrated, thinned and compressed, evaluate pools in each tier and load balance (move volumes to balance capacity and performance across pools in each tier).

Figure 6:
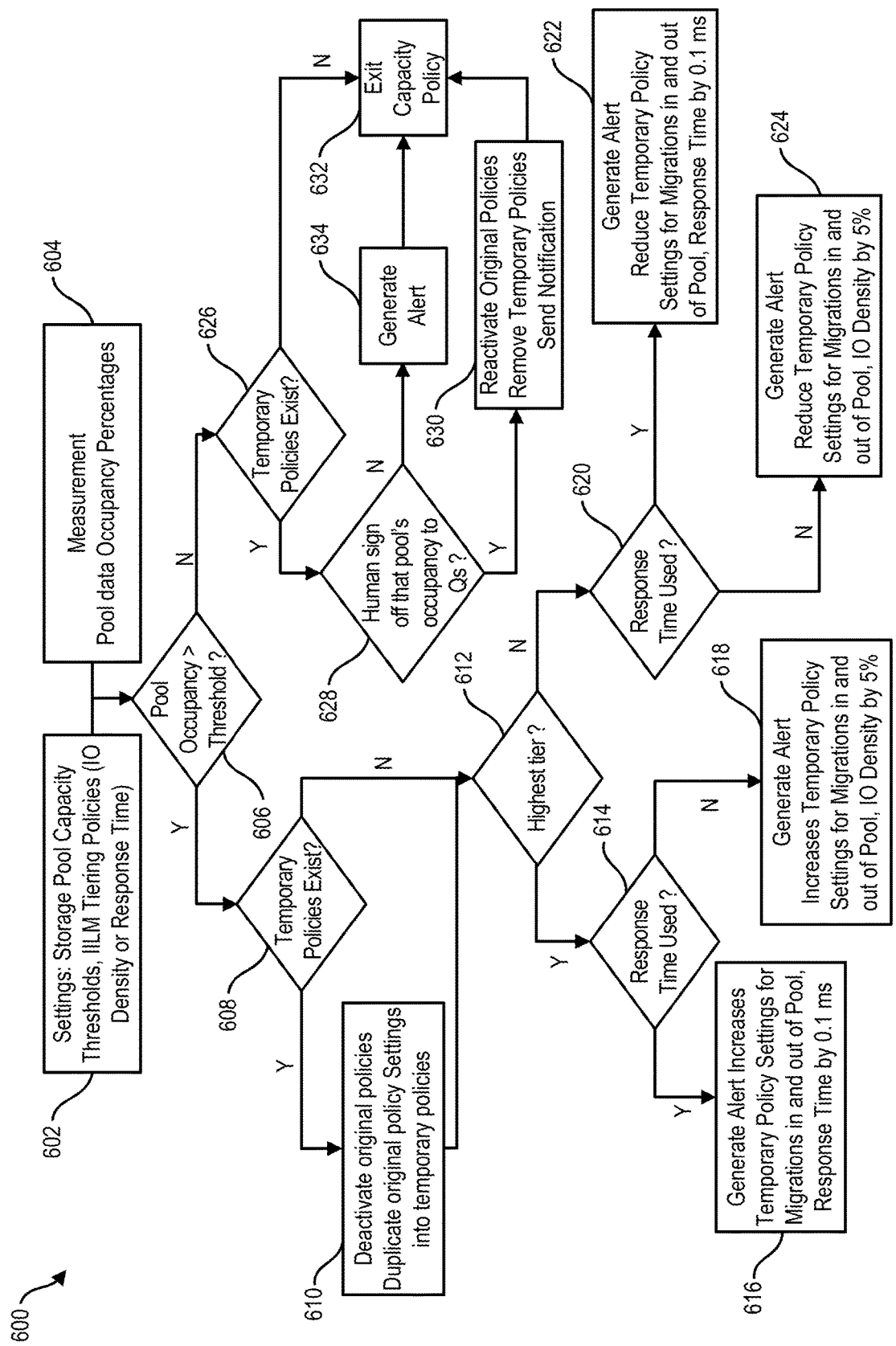
FIG. 6 is a flow diagram for one example of operation of an IILM engine during a processing window thereof in a storage environment with temporary storage policies, in accordance with one or more aspects of the present disclosure.

FIG. 6 is a flow diagram 600 for one example of operation of an IILM engine during a processing cycle thereof in a storage environment with temporary storage policies, in accordance with one or more aspects of the present disclosure. Settings 602 may include, for example, storage pool capacity thresholds and Intelligent Information Lifecycle Management tiering policies (e.g., I/O density or response time), along with measurements 604, which may include, for example, current pool data occupancy percentages. An inquiry 606 is made as to whether the pool data occupancy is above a predetermined threshold. If the pool occupancy is above the threshold (i.e., a "yes" answer to inquiry 606), an inquiry 608 is made as to whether any temporary policies exist. If temporary policies do exist (i.e., a "yes" answer to inquiry 608), the original policies are duplicated and deactivated 610 and the settings (see 602) are moved into the temporary policies. Regardless of the answer to inquiry 608, an inquiry 612 is made as to whether the current volume is in the highest tier, such that it cannot be tiered-up. If the answer to inquiry 612 is "yes," an inquiry 614 is made as to whether the pool response time is used. "Volume response time," refers to whether the response time is being used to determine migrations. For example, if volume response time is used, a policy where the volume is up-tiered if response time is >4 ms. As another example, if the volume response time is not used, a policy where the volume is up-tiered to tier 1 if I/O density is >100 IOPS/GB (accesses per gigabyte). Keeping with this example, if above the capacity threshold and volume response time is being used, a temporary to up-tiering could be done, in one example, if response time is >4.1 ms. If above the capacity threshold and volume response time is not being used, a temporary uptiering to tier 1 could be done if I/O density is >105 IOPS/GB. If the answer to inquiry 614 is "yes," an alert is generated 616 regarding response time for migration into/out of a pool in the policy settings being increased by, for example, 8.1 ms. If the answer to inquiry 614 is "no," an alert is generated 618 and I/O density for migration into/out of a pool in the policy settings may be increased by, for example, about five percent. Returning to inquiry 612, if the answer is "no," then an inquiry 620 is made as to whether the volume response time is used. If the answer to inquiry 622 is "yes," an alert is generated 624 regarding response time for migration into/out of a pool in the policy settings being decreased by, for example, 8.1 ms. If the answer to inquiry 620 is "no," an alert is generated 624 and I/O density for migration into/out of a pool in the policy settings being decreased by, for example, five percent. Returning to inquiry 606, if the answer is "no," an inquiry 626 is made as to whether any temporary policies exist. If the answer to inquiry 626 is "yes," an inquiry 628 is made as to, for example, whether a human has signed off on the pool's capacity. If the answer to inquiry 628 is "yes," a notification is sent 630 that the original policies are reactivated and the temporary policies removed and the system exits 632 the capacity policy. Returning to inquiry 628, if the answer is "no," an alert may be generated 634 and the system exits the capacity policy.

Certain embodiments herein may offer various technical computing advantages involving computing advantages to address information lifecycle management in the realm of computer networks. Embodiments herein can include, for example, with regard to an IILM engine, dynamic prioritization of the policies created. Embodiments herein can include, for example, with regard to IILM, cognitively translating predetermined business rules into action(s) against storage volume(s) based, at least in part, on the prioritized policies. Embodiments herein can include, for example, with regard to IILM, virtual storage volumes. Embodiments herein can include, for example, with regard to IILM, that the predetermined business rules can include manipulating one or more of the virtual storage volume(s) while avoiding physical data migration. Embodiments herein can include, for example, with regard to IILM, prior to the translating, performing an analysis, by the data processing system, of available storage in the storage environment, the translating being also based, at least in part, on results of the analysis. Embodiments herein can include, for example, with regard to IILM, that the predetermined business rules include at least two of ensuring operational integrity of the storage environment, ensuring data availability and minimizing storage cost. Embodiments herein can include, for example, with regard to IILM, that the prioritized policies include first tiering up for best performance, second tiering down to free up faster storage, third transforming by thinning and fourth transforming by compressing. Embodiments herein can include, for example, with regard to IILM, that the transforming by compressing is performed as a result of determining that a given storage volume of the storage volumes is compressible to a predetermined compression ratio. Embodiments herein can include, for example, with regard to IILM, cognitively adapting, by the data processing system, to changes in the storage environment by automatically changing to another business rule of the predetermined business rules upon a presence of criterion. Embodiments herein can include, for example, with regard to IILM, that the policies include one of tiering up and tiering down a given storage volume based on a number of accesses of the given storage volume. Embodiments herein can include, for example, with regard to IILM, that the executing is performed according to a migration window, the migration window including at least one of time and bandwidth.

In the case where user responses include free-form text, Natural Language Understanding may be used. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

A Natural Language Understanding (NLU) process for determining one or more NLU output parameters of input text, for example, can be used. NLU processes can include one or more of a topic classification process that determines topics of input text and output one or more NLU output parameters, a sentiment analysis process which determines a sentiment parameter for input text, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

By running of NLU processes, a number of items can be addressed, including one or more of (a) topic classification and output of one or more topic NLU output parameter for a received message (b) sentiment classification and output of one or more sentiment NLU output parameter for a received message or (c) other NLU classifications and output of one or more other NLU output parameter for the received text.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, IBM's Watson APIs (Application Programming Interface), one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining the Watson Natural Language Classifier service with the Watson Conversation service if one wants their application to engage in a conversation with a user; and classifying frequently asked questions (FAQs).

In one example, a cognitive computer system can perform various aspects of the disclosure. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

One or more aspects of the present disclosure may be incorporated and/or used in a computing environment, and example of which is described with reference to FIG. 7.

Figure 7:
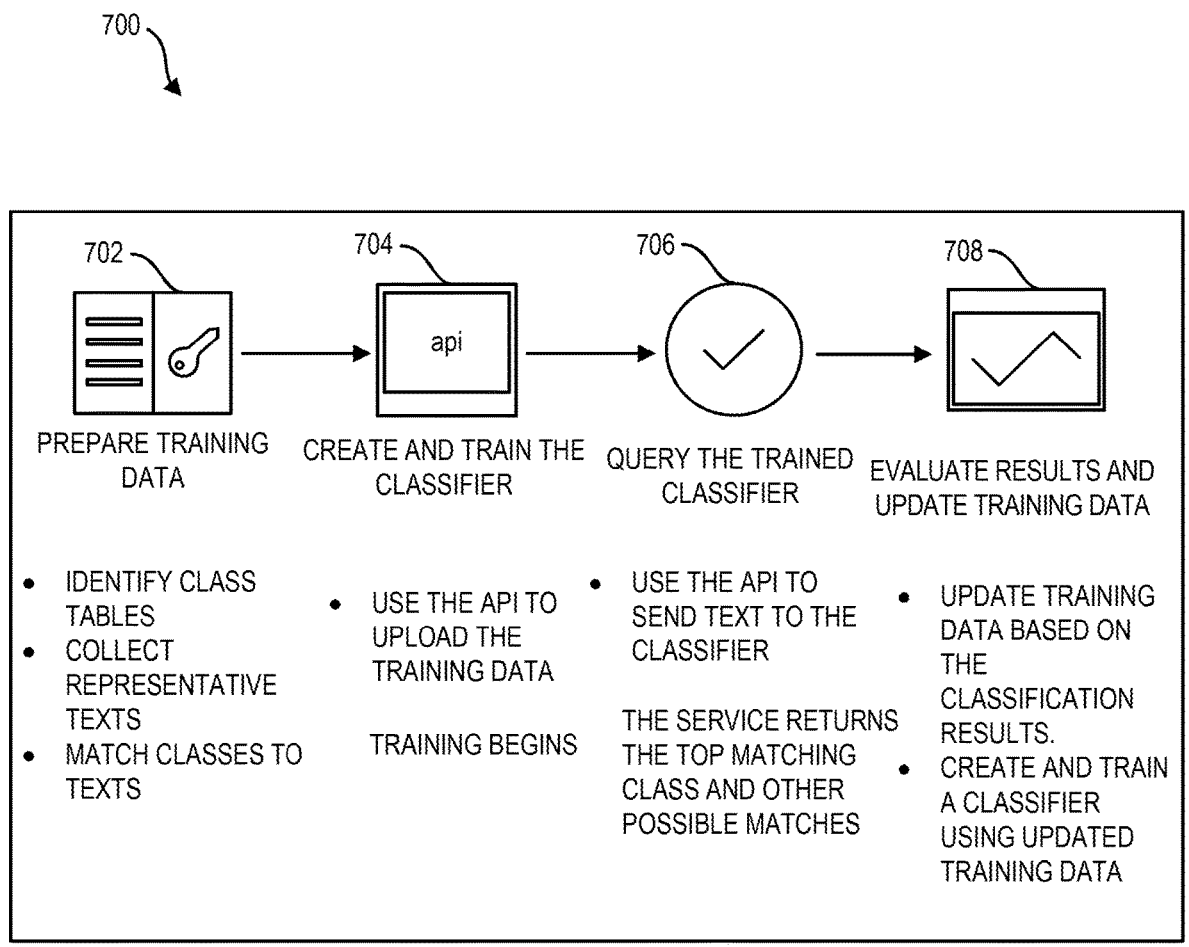
FIG. 7 is a modified flow diagram for one example of creating a natural language classifier, in accordance with one or more aspects of the present disclosure.

FIG. 7 is a hybrid flow diagram 700 of one example of an overview of the basic steps for creating and using a natural language classifier service. Initially, training data for machine learning is prepared, 702, by identifying class tables, collecting representative texts and matching the classes to the representative texts. An API (Application Planning Interface) may then be used to create and train the classifier 704 by, for example, using the API to upload training data. Training may begin at this point. After training, queries can be made to the trained natural language classifier, 706. For example, the API may be used to send text to the classifier. The classifier service then returns the matching class, along with other possible matches. The results may then be evaluated and the training data updated, 708, for example, by updating the training data based on the classification results. Another classifier can then be trained using the updated training data.

NLU processes to process data for preparation of records that are stored in a database, for example, and for other purposes. A Natural Language Understanding (NLU) process for determining one or more NLU output parameters of a user response. NLU processes can include one or more of a topic classification process that determines topics of messages and output one or more topic output parameter, a sentiment analysis process which determines sentiment parameter for a message, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

NLU processes can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Various decision data structures can be used to drive artificial intelligence (AI) decision making, such as decision data structure that cognitively translates business rule(s) into action(s) against storage volume(s) based, at least in part, on prioritized policies. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, the term "cognitively translating" refers to the use of cognitive computing in translation business rules into actions in real-time. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

In a first aspect, disclosed above is a computer-implemented method. The computer-implemented method includes: reading, by a data processing system of a storage environment, predetermined business rules and policies for managing data in storage volumes of the storage environment based on the predetermined business rules; analyzing, by the data processing system, available storage and capacity in the storage environment; dynamically prioritizing, by the data processing system, the policies, based, at least in part, on results of the analyzing, resulting in prioritized policies; cognitively translating, by the data processing system, the predetermined business rule(s) into action(s) against the storage volume(s) based, at least in part, on the prioritized policies, and executing, by the data processing system, the action(s).

In one example, the storage volumes may include, for example, virtual storage volume(s). In one example, the predetermined business rules may include, for example, manipulating one or more of the virtual storage volume(s) while avoiding physical data migration.

In one example, the computer-implemented method of the first aspect may further include, prior to the translating, performing an analysis, by the data processing system, of available storage in the storage environment, the translating being also based, at least in part, on results of the analysis.

In one example, the predetermined business rules in the computer-implemented method of the first aspect may include, for example, at least two of ensuring operational integrity of the storage environment, ensuring data availability and minimizing storage cost.

In one example, the prioritized policies in the computer-implemented method of the first aspect may include, for example, first tiering up for best performance, second tiering down to free up faster storage, third transforming by thinning and fourth transforming by compressing. In one example, the transforming by compressing is performed as a result of determining that a given storage volume of the storage volumes is compressible to a predetermined compression ratio.

In one example, the computer-implemented method of the first aspect may further include, for example, cognitively adapting, by the data processing system, to changes in the storage environment by automatically changing to another business rule of the predetermined business rules upon a presence of one or more criterion.

In one example, the policies in the computer-implemented method of the first aspect may include, for example, one of tiering up and tiering down a given storage volume based on a number of accesses of the given storage volume.

In one example, the executing in the computer-implemented method of the first aspect may be, for example, performed according to a migration window, the migration window including at least one of time and bandwidth.

In a second aspect, disclosed above is a system. The system includes, a memory, and processor(s) in communication with the memory to perform a method. The method includes: reading, by a data processing system of a storage environment, predetermined business rules and policies for managing data in storage volumes of the storage environment, the policies being based on the predetermined business rules; analyzing, by the data processing system, available storage and capacity in the storage environment; dynamically prioritizing, by the data processing system, the policies based, at least in part, on results of the analyzing, resulting in prioritized policies; cognitively translating, by the data processing system, one or more of the predetermined business rules into action(s) against one or more of the storage volumes based, at least in part, on the prioritized policies; and executing, by the data processing system, the action(s).

In one example, the storage volumes may include, for example, virtual storage volume(s), and the predetermined business rules may include, for example, manipulating one or more of the virtual storage volume(s) while avoiding physical data migration.

In one example, the policies in the system of the second aspect may include, for example, tiering up for best performance, tiering down to free up faster storage, transforming by thinning and transforming by compressing.

In one example, the system of the second aspect may further include, for example, cognitively adapting, by the data processing system, to changes in the storage environment by automatically changing to another business rule of the predetermined business rules upon a presence of one or more criterion. One example of one or more criterion that may change includes the speed and composition of the highest tier. For example, suppose there are three tiers of SAS Flash Tier 1, SAS Enterprise disk Tier 2, and SATA disk Tier 3. If NVME flash is added and the SATA disk retired, now NVME flash is Tier 1, SAS Flash is Tier 2, and SAS Enterprise disk is Tier 3—The old Tier 1 became Tier 2 because something faster was introduced. Another criterion that may change is the capacity threshold. If the speed at which volumes can be migrated increases (e.g., due to having faster interconnects between storage devices) it may be possible to have higher capacity thresholds because volumes are able to more quickly be moved out of a given tier if space becomes severely constrained in that tier.

In one example, the policies in the system of the second aspect may include, for example, one of tiering up and tiering down a given storage volume based on accesses of the given storage volume.

In a third aspect, disclosed above is computer program product. The computer program product includes a storage medium readable by a processor and storing instructions for performing a method. The method includes creating, by a data processing system of a storage environment, policies for managing data in storage volumes of the storage environment based on a business rule of predetermined business rules. The computer-implemented method includes dynamically prioritizing, by the data processing system, the policies, resulting in prioritized policies, cognitively translating, by the data processing system, one or more of the predetermined business rules into action(s) against one or more of the plurality of storage volumes based, at least in part, on the prioritized policies, and executing, by the data processing system, the action(s).

In one example, the storage volumes may include, for example, virtual storage volume(s), and the predetermined business rules may include, for example, manipulating one or more of the virtual storage volume(s) while avoiding physical data migration.

In one example, the policies in the computer program product of the third aspect may include, for example, tiering up for best performance, tiering down to free up faster storage, transforming by thinning and transforming by compressing.

In one example, the computer program product of the third aspect may further include, for example, cognitively adapting, by the data processing system, to changes in the storage environment by automatically changing to another business rule of the predetermined business rules upon a presence of one or more criterion. One example of one or more criterion that may change includes the speed and composition of the highest tier. For example, suppose there are three tiers of SAS Flash Tier 1, SAS Enterprise disk Tier 2, and SATA disk Tier 3. If NVME flash is added and the SATA disk retired, now NVME flash is Tier 1, SAS Flash is Tier 2, and SAS Enterprise disk is Tier 3—The old Tier 1 became Tier 2 because something faster was introduced. Another criterion that may change is the capacity threshold. If the speed at which volumes can be migrated increases (e.g., due to having faster interconnects between storage devices) it may be possible to have higher capacity thresholds because volumes are able to more quickly be moved out of a given tier if space becomes severely constrained in that tier.

In one example, the policies in the computer program product of the third aspect may include, for example, one of tiering up and tiering down a given storage volume based on accesses of the given storage volume.

Figure 8:
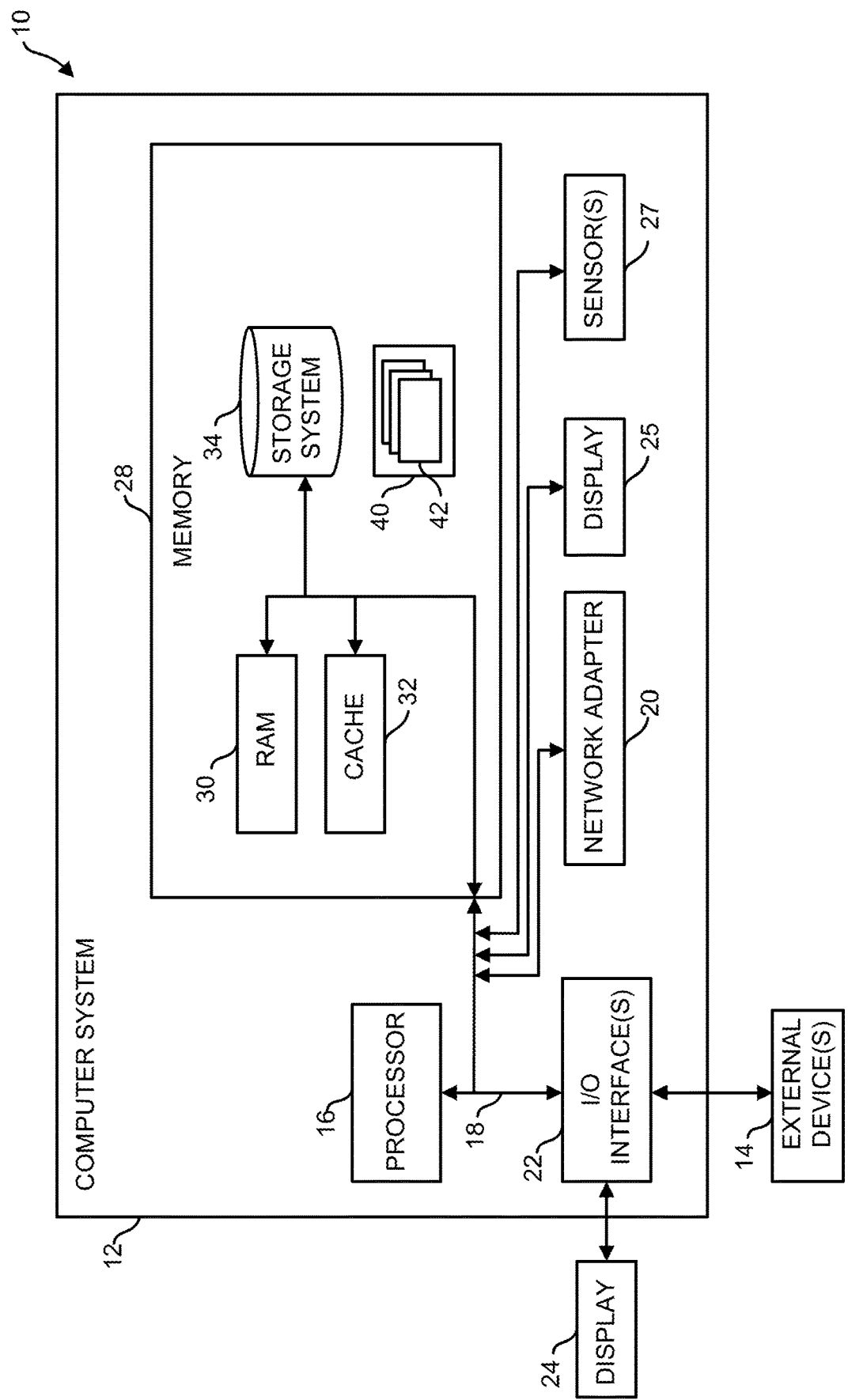
FIG. 8 is a block diagram of one example of a computer system, in accordance with one or more aspects of the present disclosure.
Figure 9:
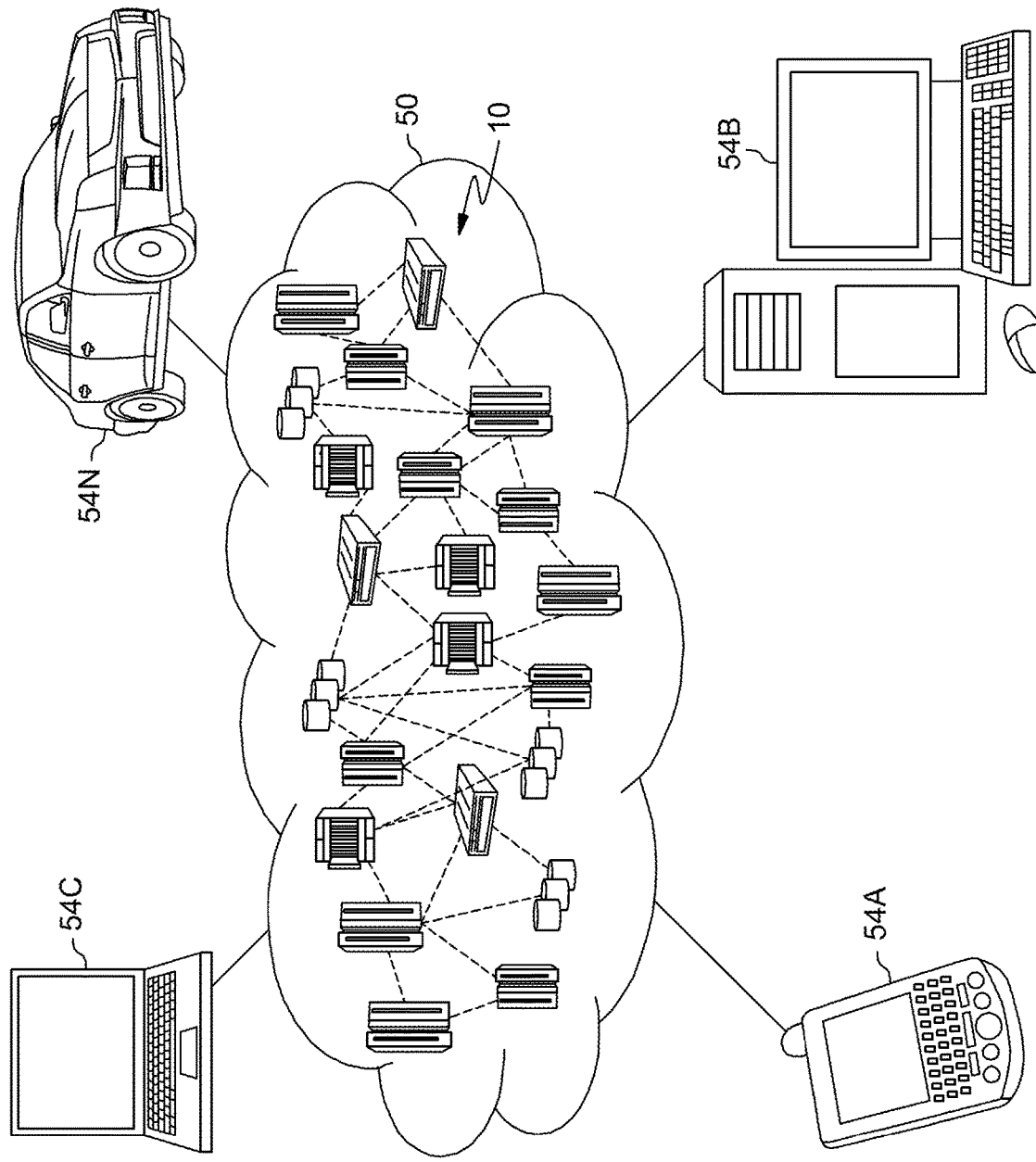
FIG. 9 is a block diagram of one example of a cloud computing environment, in accordance with one or more aspects of the present disclosure.
Figure 10:
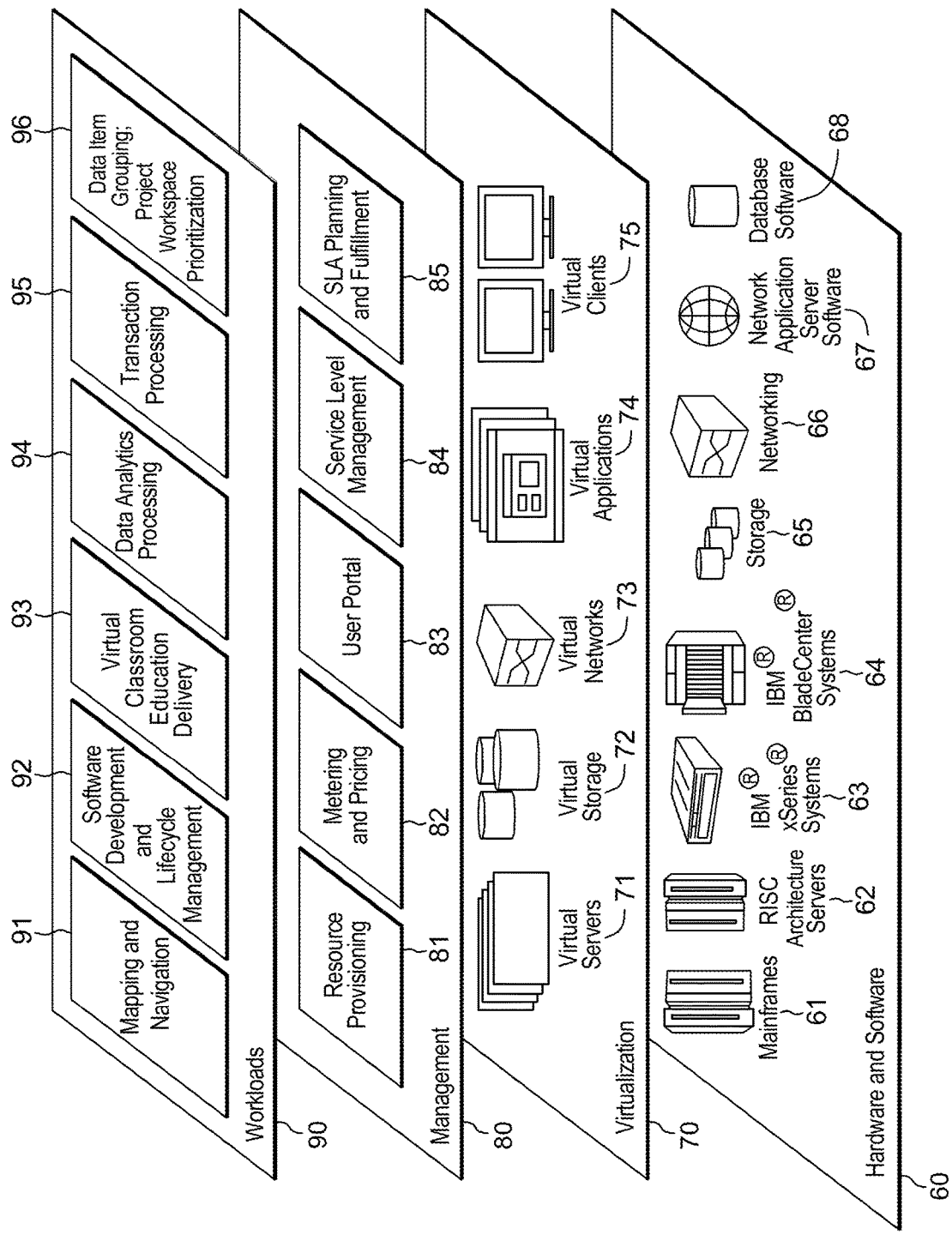
FIG. 10 is a block diagram of one example of functional abstraction layers of the cloud computing environment of FIG. 9, in accordance with one or more aspects of the present disclosure.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include, for example: mapping and navigation 91; software development and lifecycle management 92; virtual classroom education delivery 93; data analytics processing 94; transaction processing 95; and data item grouping/project workspace prioritization 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow diagrams or flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of information lifecycle management, the computer-implemented method comprising:
    reading, by a data processing system of a storage environment, a plurality of predetermined business rules and a plurality of policies for managing data in a plurality of storage volumes of the storage environment, the plurality of policies being based on the plurality of predetermined business rules, wherein the plurality of policies comprises at least one of migration of one or more of the plurality of storage volumes, transforming one or more of the plurality of storage volumes, the transforming comprising one of compression of one or more of the plurality of storage volumes and thinning of the one or more of the plurality of storage volumes, the thinning comprising altering an amount of reserved space for one or more of the plurality of storage volumes, and wherein the plurality of predetermined business rules comprises at least one operational goal for the information life cycle management;
    analyzing, by the data processing system, available storage and capacity in the storage environment;
    dynamically prioritizing, by the data processing system, the plurality of policies based, at least in part, on results of the analyzing, resulting in prioritized policies;
    cognitively translating, by the data processing system, one or more of the plurality of predetermined business rules into one or more actions against one or more of the plurality of storage volumes based, at least in part, on the prioritized policies; and
    executing, by the data processing system, the one or more actions.

2. The computer-implemented method of claim 1, wherein the plurality of storage volumes comprises at least one virtual storage volume.

3. The computer-implemented method of claim 2, wherein the at least one operational goal comprises manipulating one or more of the at least one virtual storage volume while avoiding physical data migration.

4. The computer-implemented method of claim 1, wherein the at least one operational goal comprises at least two of ensuring operational integrity of the storage environment, ensuring data availability and minimizing storage cost.

5. The computer-implemented method of claim 1, wherein the plurality of policies the migration comprises tiering up for best performance and tiering down to free up faster storage.

6. The computer-implemented method of claim 1, wherein the plurality of policies comprises compression, and wherein the compression is performed as a result of determining that a given storage volume of the plurality of storage volumes is compressible to a predetermined compression ratio.

7. The computer-implemented method of claim 5, wherein the prioritized policies comprise first tiering up for best performance, second tiering down to free up faster storage, third transforming by thinning and fourth transforming by compressing.

8. The computer-implemented method of claim 1, further comprising cognitively adapting, by the data processing system, to changes in the storage environment by automatically changing to another business rule of the plurality of predetermined business rules upon a presence of one or more criterion.

9. The computer-implemented method of claim 5, wherein the tiering up and tiering down are performed on a given storage volume based on accesses of the given storage volume.

10. The computer-implemented method of claim 1, wherein the executing is performed according to a migration window, wherein the migration window comprises at least one of time and bandwidth.

11. A system, comprising:
a memory; and
at least one processor in communication with the memory to perform a method of information lifecycle management, the method comprising:
reading, by a data processing system of a storage environment, a plurality of predetermined business rules and a plurality of policies for managing data in a plurality of storage volumes of the storage environment, the plurality of policies being based on the plurality of predetermined business rules, wherein the plurality of policies comprises at least one of migration of one or more of the plurality of storage volumes, transforming one or more of the plurality of storage volumes, the transforming comprising one of compression of one or more of the plurality of storage volumes and thinning of the one or more of the plurality of storage volumes, the thinning comprising altering an amount of reserved space for one or more of the plurality of storage volumes, and wherein the plurality of predetermined business rules comprises at least one operational goal for the information life cycle management;
analyzing, by the data processing system, available storage and capacity in the storage environment;
dynamically prioritizing, by the data processing system, the plurality of policies based, at least in part, on results of the analyzing, resulting in prioritized policies;
cognitively translating, by the data processing system, one or more of the plurality of predetermined business rules into one or more actions against one or more of the plurality of storage volumes based, at least in part, on the prioritized policies; and
executing, by the data processing system, the one or more actions.

12. The system of claim 11, wherein the plurality of storage volumes comprises at least one virtual storage volume, and wherein the at least one operational goal comprises manipulating one or more of the at least one virtual storage volume while avoiding physical data migration.

13. The system of claim 11, wherein the plurality of policies comprises tiering up for best performance, tiering down to free up faster storage, transforming by thinning and transforming by compressing.

14. The system of claim 11, further comprising cognitively adapting, by the data processing system, to changes in the storage environment by automatically changing to another business rule of the plurality of predetermined business rules upon a presence of one or more criterion.

15. The system of claim 11, wherein the migration comprises one of tiering up and tiering down a given storage volume based on accesses of the given storage volume.

16. A computer program product, comprising:
a storage medium readable by a processor and storing instructions for performing a method of information lifecycle management, the method comprising:
reading, by a data processing system of a storage environment, a plurality of predetermined business rules and a plurality of policies for managing data in a plurality of storage volumes of the storage environment, the plurality of policies being based on the plurality of predetermined business rules, wherein the plurality of policies comprises at least one of migration of one or more of the plurality of storage volumes, transforming one or more of the plurality of storage volumes, the transforming comprising one of compression of one or more of the plurality of storage volumes and thinning of the one or more of the plurality of storage volumes, the thinning comprising altering an amount of reserved space for one or more of the plurality of storage volumes, and wherein the plurality of predetermined business rules comprises at least one operational goal for the information life cycle management;
analyzing, by the data processing system, available storage and capacity in the storage environment;
dynamically prioritizing, by the data processing system, the plurality of policies based, at least in part, on results of the analyzing, resulting in prioritized policies;
cognitively translating, by the data processing system, one or more of the plurality of predetermined business rules into one or more actions against one or more of the plurality of storage volumes based, at least in part, on the prioritized policies; and
executing, by the data processing system, the one or more actions.

17. The computer program product of claim 16, wherein the plurality of storage volumes comprises at least one virtual storage volume, and wherein the at least one operational goal comprises manipulating one or more of the at least one virtual storage volume while avoiding physical data migration.

18. The computer program product of claim 16, wherein the migration comprises tiering up for best performance and tiering down to free up faster storage.

19. The computer program product of claim 16, further comprising cognitively adapting, by the data processing system, to changes in the storage environment by automatically changing to another business rule of the plurality of predetermined business rules upon a presence of one or more criterion.

20. The computer program product of claim 18, wherein the tiering up and tiering down are performed on a given storage volume based on accesses of the given storage volume.

\* \* \* \* \*